(12) United States Patent
Charrat et al.

(10) Patent No.: US 10,699,353 B2
(45) Date of Patent: Jun. 30, 2020

(54) NON-STANDARD DATA MANAGEMENT IN A DATA MANAGEMENT SYSTEM

(71) Applicant: Amadeus S.A.S., Biot (FR)

(72) Inventors: Christel Charrat, Vallauris (FR); Vanessa Fontebride, Le Rouret (FR); Olivier Tacaille, Valbonne (FR); Taoufik Tazi, Nice (FR); Olivier Kuffler, Antibes (FR)

(73) Assignee: AMADEUS S.A.S., Biot (FR)

( * ) Notice: Subject to any disclaimer, the term of this patent is extended or adjusted under 35 U.S.C. 154(b) by 319 days.

(21) Appl. No.: 15/437,991

(22) Filed: Feb. 21, 2017

(65) Prior Publication Data

US 2018/0240207 A1 Aug. 23, 2018

(51) Int. Cl.
*G06Q 50/14* (2012.01)
*G06Q 10/02* (2012.01)
*G06F 16/22* (2019.01)

(52) U.S. Cl.
CPC .............. *G06Q 50/14* (2013.01); *G06F 16/22* (2019.01); *G06Q 10/02* (2013.01); *G06Q 10/025* (2013.01)

(58) Field of Classification Search
CPC ....... G06Q 50/14; G06Q 10/025; G06Q 10/02
See application file for complete search history.

(56) References Cited

U.S. PATENT DOCUMENTS

| 6,085,169 A | * | 7/2000 | Walker | G06Q 10/02 |
| | | | | 705/4 |
| 6,415,270 B1 | * | 7/2002 | Rackson | G06Q 30/02 |
| | | | | 705/36 R |
| 9,367,563 B2 | | 6/2016 | Fontebride et al. | |
| 10,248,913 B1 | * | 4/2019 | Gururajan | G06Q 50/30 |

(Continued)

FOREIGN PATENT DOCUMENTS

FR 3021790 A1 12/2015

OTHER PUBLICATIONS

Sien Chen, Understanding Airline Passenger Behavior through PNR, SOW and Webtrends Data Analysis, 2015, IEEE (Year: 2015).*

(Continued)

*Primary Examiner* — Kevin H Flynn
*Assistant Examiner* — Ismail A Manejwala
(74) *Attorney, Agent, or Firm* — Thompson Hine LLP

(57) ABSTRACT

Systems, methods, and computer program products for managing non-standard data. A data management system stores profile records for non-standard providers in a DTN database, and elements defining an itinerary in an EDR database. The data management system queries the DTN database for profiles matching search criteria, and generates a service request for one of the matching profiles. The service request is stored in an extended data structure of an extended data record in the EDR database. The extended data record includes a standard data structure for storing standard elements and the extended data structure for storing (Continued)

non-standard elements. The service request is also transmitted to non-standard provider systems. Service offers from the non-standard provider systems are stored in the extended data structure. The system thereby manages an itinerary that includes non-standard services defined by the non-standard elements and standard services defined by the standard elements using the extended data record.

19 Claims, 4 Drawing Sheets

(56) References Cited

U.S. PATENT DOCUMENTS

| | | | | |
|---|---|---|---|---|
| 2004/0019528 A1* | 1/2004 | Broussard | ............ | G06Q 20/102 |
| | | | | 705/26.1 |
| 2015/0317295 A1* | 11/2015 | Sherry | .................. | G06F 17/243 |
| | | | | 715/226 |
| 2015/0347476 A1* | 12/2015 | Fontebride | .............. | G06F 16/22 |
| | | | | 707/741 |
| 2016/0379173 A1* | 12/2016 | Karnati | .............. | G06Q 10/1095 |
| | | | | 705/7.19 |

OTHER PUBLICATIONS

European Patent Office, International Search Report and Written Opinion issued in International Application No. PCT/EP2018/053881 dated Apr. 3, 2018.

* cited by examiner

NON-STANDARD DATA MANAGEMENT IN A DATA MANAGEMENT SYSTEM

BACKGROUND

A Global Distribution System (GDS) is a data processing system that provides processing and database functions which facilitate management of travel related services from multiple providers. User systems may connect to and use the GDS to search for, price, book, purchase, and use travel related services, such as flights, hotel rooms, or car rentals. To provide these management functions, the GDS relies on a centralized database to keep track of travel services that have been reserved, booked, and/or used by the traveler. This centralized database is often referred to as a Passenger Name Record (PNR) database, and stores a collection of database records (i.e., PNRs) that include data fields containing information about travelers and their itineraries.

To manage the sale and use of a travel service, the GDS will typically communicate with a computer system operated by the provider of the travel service. For example, the GDS may interact with a Computerized Reservation System (CRS) operated by an airline, a hotel, or a car rental company to manage the sale and use of the travel services identified in the PNR. For this reason, the GDS is limited to managing travel services from a few large providers that have a CRS or other suitable system capable of interfacing with the GDS.

A destination service provider is a company that provides travel services locally at a destination. Destination service providers typically possess specific knowledge relating to the traveler's destination and/or expertise in providing a specialized service at the destination. In some cases, a traveler may wish to book a travel service from a destination service provider. However, assuming the destination service provider maintains a computer system for reserving services at all, these systems are unable to communicate with the GDS or access PNRs due to standardization constraints, to protect sensitive information stored in the PNR, and for security reasons. Thus, a travel agent or a traveler booking a trip including a service from a destination service provider will not be able to use the centralized management functions provided by the GDS, or add a record to the PNR for managing a full travel itinerary that includes a service provided by a destination service provider.

The inability to manage destination service provider services using the GDS may create several problems for the travel agent or the traveler. For example, the GDS search engine may lack access to destination service provider information, making it difficult for the system user to identify a desired service. If the system user manages to identify the service, for destinations in foreign locations, differences between the language used by the system user and the language used by the destination service provider may hinder booking of the destination travel service. In cases where the system user identifies and books the service, the user will still be unable to use the GDS or the centralized record keeping provided by the PNR to manage the service as part of a complete itinerary.

Thus, improved systems, methods, and computer program products are needed that improve the ability to search for, reserve, price, book, and track the use of travel services provided by destination service providers.

SUMMARY

In an embodiment of the invention, a data processing system that uses an extended data structure to manage service offers having a non-standard format is provided. The system includes one or more processors and a memory coupled to the processors. The memory stores program code that, when executed by at least one of the one or more processors, causes the system to link a standard data structure having a standard format to the extended data structure having the non-standard format. The program code further causes the system to generate a service request, store the service request in a first field of the extended data structure, and transmit the service request to a first server of a first service provider. In response to receiving a first service offer from the first server, the program code causes the system to store the first service offer in a second data field of the extended data structure.

In another aspect of the invention, the standard data structure is linked to the extended data structure by storing, in a third data field of the standard data structure, data that identifies a location of the extended data structure in a database.

In another aspect of the invention, the program code further causes the system to receive a search query from a client application, the search query including a search criteria. In response to receiving the search query, the program code further causes the system to search a database for profile records that match the search criteria, each of the profile records in the database defining a respective service and identifying a respective provider of the service. The program code further causes the client application to display one or more of the matching profile records and receive an input identifying one of the one or more of the matching profile records. The identified profile record defines the service provided by the first service provider, and the service request is generated in response to receiving the input.

In another aspect of the invention, each profile record is associated with a ranking value, and the one or more of the matching profile records displayed by the client application are selected from the matching profile records based at least in part on the ranking value of each of the matching profile records.

In another aspect of the invention, the program code further causes the system to receive a rank of the first service offer from the client application, and adjust the ranking value of the profile record corresponding to the first service offer based at least in part on the rank.

In another aspect of the invention, the database is hosted by a web server, each profile record is associated with a web page that includes data describing the respective service, and the program code further causes the system to receive one or more data files from the first server and define the web page associated with the identified profile record based on the one or more data files.

In another aspect of the invention, the standard data structure includes one or more elements that define an itinerary, and the program code further causes the system to receive a first request to book the itinerary. In response to receiving the first request, the program code further causes the system to extract the first service offer from the extended data structure, and transmit a second request to the first service provider to book the first service offer.

In another aspect of the invention, the program code further causes the system to receive a booking confirmation from the first service provider, and in response to receiving the booking confirmation, change a status of the first service offer from pending to booked in the extended data structure.

In another aspect of the invention, the program code further causes the system to transmit the service request to a second server of a second service provider, receive a second service offer from the second service provider, and store the first service offer and the second service offer in the extended data structure with a status of open. In response to receiving authorization from a client application to accept the first service offer, the program code further causes the system to change the status of the first service offer from open to pending.

In another embodiment of the invention, a method of using the extended data structure to manage service offers having the non-standard format is provided. The method includes linking the standard data structure having the standard format to the extended data structure having the non-standard format, generating the service request, storing the service request in the first field of the extended data structure, and transmitting the service request to the first server of the first service provider. In response to receiving the first service offer from the first server, the method stores the first service offer in the second data field of the extended data structure.

In another aspect of the invention, the method further includes linking the standard data structure to the extended data structure by storing, in the standard data structure, the third data field that identifies the location of the extended data structure in the database.

In another aspect of the invention, the standard data structure and the extended data structure comprise the extended data record.

In another aspect of the invention, the method further includes receiving the search query including the search criteria from the client application. In response to receiving the search query, the method searches the database for profile records that match the search criteria, each of the profile records in the database defining the respective service and identifying the respective provider of the service. The method further includes causing the client application to display one or more of the matching profile records, and receiving an input identifying one of the one or more of the matching profile records. The identified profile record defines the service provided by the first service provider, and the service request is generated in response to receiving the input.

In another aspect of the invention, each profile record is associated with the ranking value, and the one or more of the matching profile records displayed by the client application are selected from the matching profile records based at least in part on the ranking value of each of the matching profile records.

In another aspect of the invention, the method further includes receiving the rank of the first service offer from the client application, and adjusting the ranking value of the profile record corresponding to the first service offer based at least in part on the rank.

In another aspect of the invention, the database is hosted by the web server, each profile record is associated with the web page that includes data describing the respective service, and the method further includes receiving one or more data files from the first server and defining the web page associated with the identified profile record based on the one or more data files.

In another aspect of the invention, the standard data structure includes the third data field that defines the itinerary, and the method further includes receiving the first request to book the itinerary. In response to receiving the first request, the method extracts the first service offer from the extended data structure, and transmits the second request to the first service provider to book the first service offer.

In another aspect of the invention, the method further includes receiving the booking confirmation from the first service provider, and in response to receiving the booking confirmation, changing the status of the first service offer from pending to booked in the extended data structure.

In another aspect of the invention, the method further includes transmitting the service request to the second server of the second service provider, receiving the second service offer from the second service provider, and storing the first service offer and the second service offer in the extended data structure with the status of open. In response to receiving authorization from the client application to accept the first service offer, the method changes the status of the first service offer from open to pending.

In another embodiment of the invention, a computer program product for using the extended data structure to manage service offers having the non-standard format is provided. The computer program product includes a non-transitory computer-readable storage medium, and program code stored on the non-transitory computer-readable storage medium that, when executed by one or more processors, causes the processors to link the standard data structure having the standard format to the extended data structure having the non-standard format. The program code further causes the processors to generate the service request, store the service request in the first field of the extended data structure, and transmit the service request to the first server of the first service provider. In response to receiving the first service offer from the first server, the program code causes the processors to store the first service offer in the second data field of the extended data structure.

The above summary may present a simplified overview of some embodiments of the invention in order to provide a basic understanding of certain aspects the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Embodiments of the invention may be implemented by a data processing system that provides processing and database functions which enable and/or facilitate interconnections between one or more travel provider systems, travel agency systems, and/or database systems. The database systems may include a new type of database that stores and manages records which define a distribution travel network, and a database that provides an extended data record for storing non-standard data and/or elements generated by the distribution travel network. The databases may be managed by a data management application configured to provide a user interface that is accessible by user and standard provider systems through a secure industry standard interface, and to non-standard provider systems through an open interface. The data management application may thereby provide users, standard providers, and non-standard providers with a single access point for viewing and managing trip information for the traveler, and that maintains compatibility with existing reservation record standards.

Figure 1:
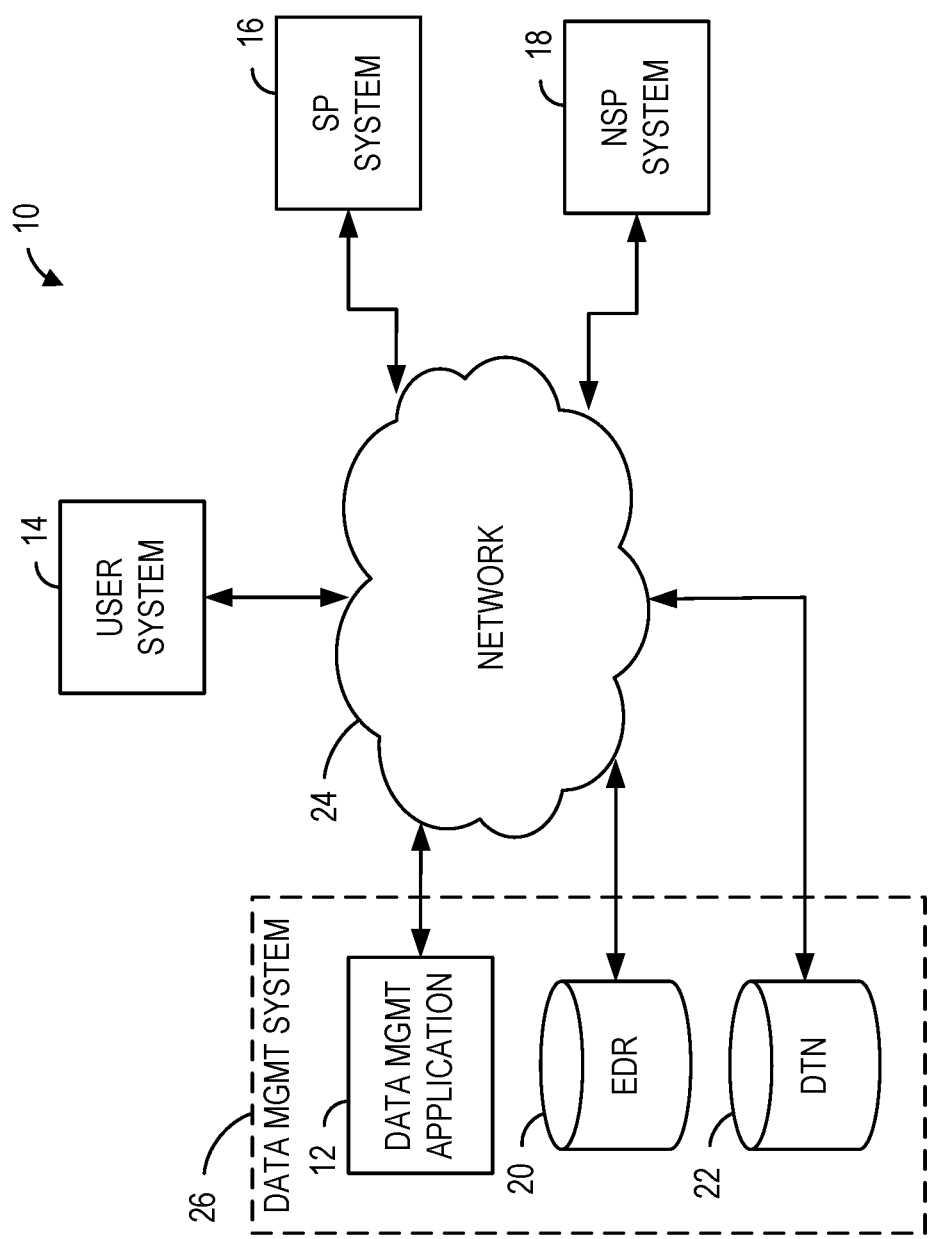
FIG. 1 is a diagrammatic view of an exemplary operating environment including a data management application, a user system, a standard provider system, a non-standard provider system, an Extended Data Record (EDR) database, a Distribution Travel Network (DTN) database, and a data management system.

Referring now to FIG. 1, an operating environment 10 in accordance with an embodiment of the invention may include a data management application 12, a user system 14, a Standard Provider (SP) system 16, a Non-Standard Provider (NSP) system 18, an Extended Data Record (EDR) database 20, and a Distribution Travel Network (DTN) database 22. The data management application 12, user system 14, SP system 16, NSP system 18, EDR database 20, and DTN database 22 may communicate through a network 24. The network 24 may include one or more private or public data networks (e.g., the Internet) that enable the exchange of data between systems connected to the network 24. In an embodiment of the invention, the data management application 12, EDR database 20, and DTN database 22, may be provided by a data management system 26.

The data management application 12 may be configured to enable the user system 14 to access standard data provided by the SP system 16, non-standard data provided by NSP system 18, as well as standard and non-standard data stored in the EDR database 20 and DTN database 22. The data management application 12 may be provided as an application in the data management system 26. In an embodiment of the invention, the data management system 26 may be integrated into a Global Distribution System (GDS). The data management application 12 may be configured to facilitate communication between systems (e.g., user system 14) used to select, reserve, and book travel products and services ("services"), and systems operated by the providers of travel services (e.g., the SP system 16). The data management application 12 may have a distributed architecture that splits functions provided by the data management application 12 into several applications, with each application being responsible for providing a given set of features.

The user system 14 may provide users (e.g., travel agents) with an interface for accessing the data management application 12 that enables the user to search for and book services. The user system 14 may also include a server application accessible by a traveler system (not shown) that enables the traveler to search for and book travel itineraries without the help of a travel agent. This application may comprise, for example, a travel-related website that is accessible over the network 24 using a client application such as a web-browser running on the traveler system.

In response to the user booking a service associated with the SP system 16, the data management application 12 may create and/or store a reservation record, such as a Passenger Name Record (PNR), in the EDR database 20. The reservation record may be generated, at least in part, by the corresponding the provider system, and may comprise one or more elements that contain itinerary and traveler information. Each of the elements may be stored in a field of the reservation record, and may define one or more services booked by the traveler. The reservation record may also track usage of the purchased services, such as whether a booked flight has been flown. The reservation record may include elements defining an itinerary for a particular trip, service, passenger, or group of passengers. The reservation record may be stored in, or otherwise associated with, an extended database record in the EDR database 20. The reservation record and/or extended database record may be associated with a record locator that uniquely identifies the record in the EDR database 20.

The SP system 16 may be operated by a standard provider of services such as an airline, and may include a Computer Reservation System (CRS) that enables other systems, such as the user system 14 and/or the data management system 26 to reserve and pay for services, such as airline tickets, hotel rooms, or rental vehicles. The SP system 16 may also interact with other SP systems (not shown), either directly or through another system (e.g., the data management system 26), to enable, for example, a validating carrier to sell tickets for seats provided by the operating carrier. The operating carrier may then bill the validating carrier for the services provided. In some embodiments of the invention, the SP system 16 may include an Electronic Ticketing System (ETS) and/or a Departure Control System (DC S) for a corresponding carrier.

Data transmitted to and received from the SP system 16 may adhere to a standardized message exchange format. For example, messages transmitted between the data management application 12 and SP system 16 may conform with rules defined by the International Air Transport Association (IATA), such as the A4A/IATA Reservations Interline Message Procedures-Passenger (AIRIMP) standard. The AIRIMP standard defines a universally agreed upon messaging protocol for passenger reservations interline messages. The AIRIMP standard may be used for handling transactions between the data management application 12, user system 14, SP system 16, and EDR database 20, and may transmit messages using Electronic Data Interchange for Administration, Commerce and Transport (EDFACT) formatting.

The NSP system 18 may be operated by a non-standard provider of services, such as a destination service provider. The NSP system 18 may host one or more applications that are used by the non-standard provider, such as a web server/client application, an email server/client application, or any other suitable application. The applications on the NSP system 18 may communicate with the data management application 12 using any suitable protocol, such as Hypertext Transfer Protocol (HTTP), File Transfer Protocol (FTP), Simple Mail Transfer Protocol (SMTP), Extensible Messaging and Presence Protocol (XMPP), to name a few.

The EDR database 20 may store data in extended data records. Each extended data record may include a standard data structure and an extended data structure that are linked or otherwise associated with each other in the EDR database 20. The standard data structure and extended data structure may each include one or more fields, with each field storing an element. Each extended data record may be assigned a record locater that uniquely identifies the extended data record. The record locator may thereby enable applications retrieving data from, or storing data to, the extended data record to locate the extended data record. The standard data structure may be configured to store standard data (e.g., a reservation record) having a standard format, and the extended data structure may be configured to store non-standard data (e.g., a service request or other non-standard element) having a non-standard format. In an embodiment of the invention, the standard data structure may comprise a PNR. The standard data structure may be stored in a partition of the EDR database 20 or in a separate database, e.g., a PNR database. The extended data structure may comprise an Extended Travel Record (ETR) that is linked to the PNR. The extended data structure may be stored in a partition of the EDR database 20 separate from the standard data structure, or in a separate database, e.g., an ETR database (not shown).

The DTN database 22 may store data in profile records. Each profile record may store data that characterizes a non-standard provider who is a member of the DTN. The profile records may also provide a catalogue of services offered by the non-standard providers through the DTN. The information stored in the profile records may include data that describes each service offered by the non-standard provider in a structured and standardized way. For example, the profile records may describe a type of service offered (e.g., jet ski rental), a location where the service can be obtained (e.g., an address), start and end dates for the service, prices of the service, a description of the service, languages spoken by the employees of the non-standard provider, a target audience for the service, a service level for the non-standard provider, a service flavor for the non-standard provider, and/or a maximum number of travelers that may be in a single party.

In operation, when a user searches for services provided by a non-standard provider, the user may transmit a search query to the data management application 12 that includes search criteria defining desired characteristics of a non-standard provider. These characteristics may be compared to characteristics in the profile records that were defined by the non-standard providers when the non-standard provider joined the DTN. For search queries having sufficient precision (e.g., a jet ski in Nice, France), the data management application 12 may query the DTN database 22 and return a list of services provided by each non-standard provider satisfying the search criteria (e.g., each jet ski rental company within a predetermined distance of Nice).

The DTN database 22 may be configured so that each non-standard provider can provide whatever level of detail describing their services they wish to provide. The structure provided by the DTN database 22 may enable travel agents and/or travelers using the system to identify precisely the possible matching services so that they can work efficiently with the non-standard providers. Non-standard service providers may access the DTN database 22 through a web-based interface that enables the exchange of data files comprising one or more web pages. The web-based interface may display and receive information using the web pages, or any other suitable electronic documents.

Figure 2:
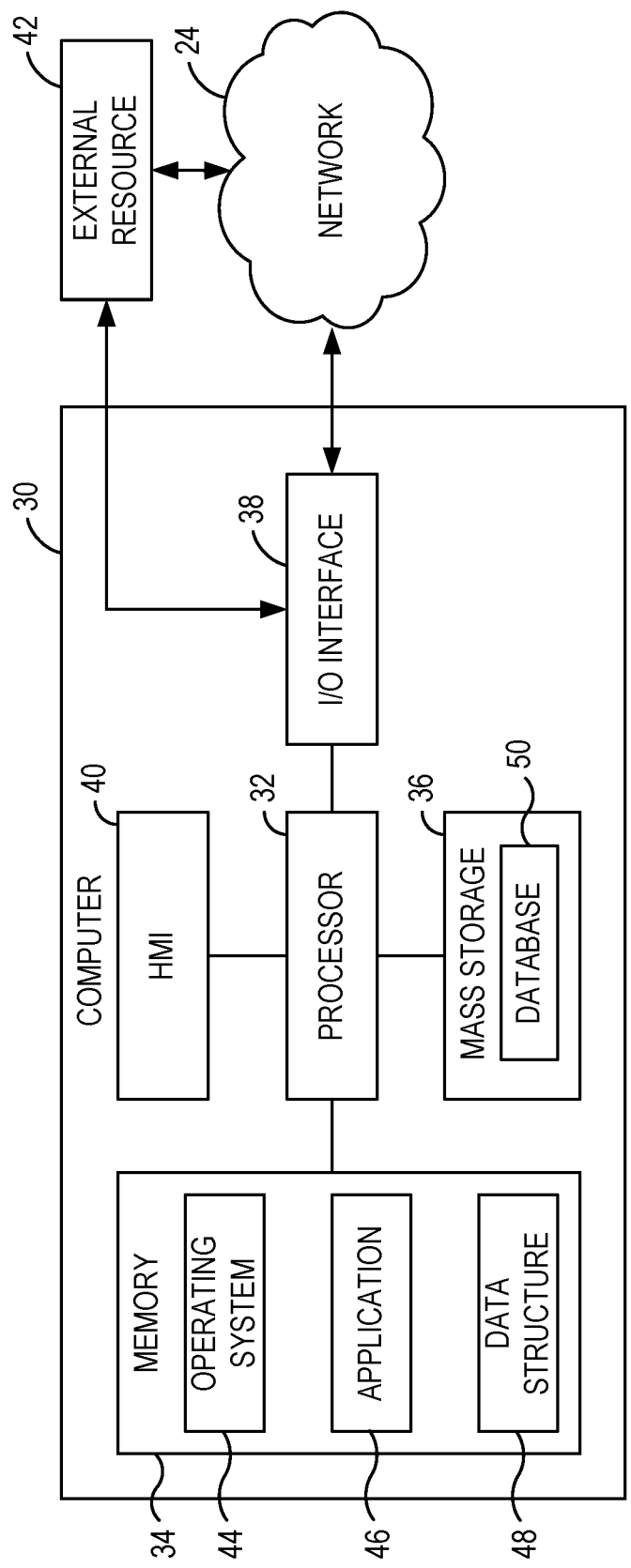
FIG. 2 is a diagrammatic view of an exemplary computer that may be used to provide the operating environment of FIG. 1.

Referring now to FIG. 2, the data management application 12, user system 14, SP system 16, NSP system 18, EDR database 20, DTN database 22, network 24, and data management system 26 of operating environment 10 may be implemented on one or more computer devices or systems, such as exemplary computer 30. The computer 30 may include a processor 32, a memory 34, a mass storage memory device 36, an input/output (I/O) interface 38, and a Human Machine Interface (HMI) 40. The computer 30 may also be operatively coupled to one or more external resources 42 via the network 24 or I/O interface 38. External resources may include, but are not limited to, servers, databases, mass storage devices, peripheral devices, cloud-based network services, or any other suitable computer resource that may be used by the computer 30.

The processor 32 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in memory 34. Memory 34 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing data. The mass storage memory device 36 may include data storage devices such as a hard drive, optical drive, tape drive, volatile or non-volatile solid state device, or any other device capable of storing data.

The processor 32 may operate under the control of an operating system 44 that resides in memory 34. The operating system 44 may manage computer resources so that computer program code embodied as one or more computer software applications, such as an application 46 residing in memory 34, may have instructions executed by the processor 32. The processor 32 may also execute the application 46 directly, in which case the operating system 44 may be omitted. The one or more computer software applications may include a running instance of an application comprising a server, which may accept requests from, and provide responses to, one or more corresponding client applications. One or more data structures 48 may also reside in memory 34, and may be used by the processor 32, operating system 44, or application 46 to store or manipulate data.

The I/O interface 38 may provide a machine interface that operatively couples the processor 32 to other devices and systems, such as the network 24 or external resource 42. The application 46 may thereby work cooperatively with the network 24 or external resource 42 by communicating via the I/O interface 38 to provide the various features, functions, applications, processes, or modules comprising embodiments of the invention. The application 46 may also have program code that is executed by one or more external resources 42, or otherwise rely on functions or signals provided by other system or network components external to the computer 30. Indeed, given the nearly endless hardware and software configurations possible, persons having ordinary skill in the art will understand that embodiments of the invention may include applications that are located externally to the computer 30, distributed among multiple computers or other external resources 42, or provided by computing resources (hardware and software) that are provided as a service over the network 24, such as a cloud computing service.

The HMI 40 may be operatively coupled to the processor 32 of computer 30 to enable a user to interact directly with the computer 30. The HMI 40 may include video or alpha-numeric displays, a touch screen, a speaker, and any other suitable audio and visual indicators capable of providing data to the user. The HMI 40 may also include input devices and controls such as an alphanumeric keyboard, a pointing device, keypads, pushbuttons, control knobs, microphones, etc., capable of accepting commands or input from the user and transmitting the input to the processor 32.

A database 50 may reside on the mass storage memory device 36, and may be used to collect and organize data used by the various systems and modules described herein. The database 50 may include data and supporting data structures that store and organize the data. In particular, the database 50 may be arranged with any database organization or structure including, but not limited to, a relational database, a hierarchical database, a network database, an object-oriented database, or combinations thereof.

A database management system in the form of a computer software application executing as instructions on the processor 32 may be used to access data stored in records of the database 50 in response to a query, where the query may be dynamically determined and executed by the operating system 44, other applications 46, or one or more modules. Although embodiments of the invention may be described herein using relational, hierarchical, network, object-oriented, or other database terminology in specific instances, persons having ordinary skill in the art will understand that embodiments of the invention may use any suitable database management model, and are not limited to any particular type of database.

The DTN may connect travel agents and non-standard providers by providing the non-standard providers access to the data management system 26. To this end, the data management application 12, EDR database 20, and DTN database 22 may operate cooperatively to enable non-standard providers to register as a member of the DTN. A non-standard provider may register as a member of the DTN, for example, by creating and registering a profile in the DTN. The profile may be stored in a record in the DTN database 22, and linked to other profiles in the DTN database 22 to define the DTN. The DTN may enable travel agents to search for and contact non-standard providers without leaving a standard travel booking environment, e.g., a user interface provided through the user system 14 by the data management system 26.

In order to detail the scope of their services, non-standard providers may add information to their profile. This information may include general information on provided services, such as the type of services (e.g., tours, events, sports, attractions), their target audience (e.g., family, couples, singles), available service levels (e.g., basic, luxury), flavors of service (e.g., adventure, ecotourism), languages spoken by employees of the provider (e.g., English, Spanish, French), and/or currencies accepted (e.g., U.S. Dollars, the Euro). This profile information may help travel agencies target a relevant set of non-standard providers to satisfy a request from a traveler.

Although non-standard providers may be members of the DTN at the time they register, they may not have a proven record of providing service. That is, they may still be unknown to travel agencies that subscribe to the DTN. To identify profiles of these non-standard providers, the data management system 26 may include a search engine configured to search the DTN database 22 for non-standard providers and services matching a query received by the data management application 12. However, the search engine may be configured so that newly registered non-standard providers appear less frequently in search results than well-known or highly rated non-standard providers.

To improve their visibility, a newly registered non-standard provider may be given an opportunity to participate in a pre-booking process that allows travel agencies to assess and rate the non-standard provider. The DTN may also be configured so that one or more travel agencies can form their own group or sub-network within the DTN. A newly registered non-standard provider may register to participate in one of these sub-networks to gain visibility. The above processes may strengthen links between profiles of travel agencies and the profiles of non-standard providers with superior services by forcing non-standard providers to demonstrate their reliability and service quality.

Once a non-standard provider is fully registered in the DTN, links may begin to form between travel agency profiles (which may also be registered in the DTN) and non-standard provider profiles, thereby creating a network of profiles. Using this network, the travel agencies may search for non-standard providers and/or services offered by the non-standard provider. To facilitate or speed up this pre-booking process, travel agencies may work exclusively with a given set of non-standard providers by, for example, forming dedicated agreements with the non-standard providers. A dedicated agreement may be created, for example, by entering into a partnership and/or commission agreement.

Travel agencies may also exclude or "blacklist" specific non-standard providers. A travel agency may blacklist a non-standard provider, for example, because of a market mismatch or based on past experience with the non-standard provider. The DTN may thereby provide each travel agency that is a member of the DTN with the ability to define their own private network of non-standard providers within the DTN. The DTN may also provide travel agencies with the ability to globally black list specified non-standard providers so that the travel agencies do not receive unwanted offers or content from the blacklisted non-standard providers.

The DTN may connect travel agents and non-standard providers through public or private networks within the DTN. These networks may be created by linking profiles in the DTN database 22. The DTN database 22 may thereby provide travel agents with access to catalogues of services available from non-standard providers in the network. Travel agents may be able to use a single user interface for pre-booking, shopping, and booking of services from both standard providers and non-standard providers. Services flagged during the pre-booking phase of travel planning may be stored in the extended data record, thereby increasing the efficiency of travel agents and providing a consistent view of the trip to the traveler.

The DTN may formalize pre-booking exchanges between non-standard providers and the travel agent using service requests. The exchange of service requests and service offers between travel agents and non-standard providers may be documented by adding elements in a corresponding extended data record. Each element added to the extended data record may include a status that indicates a state of the service request or service offer. For example, a service offer that has not been selected by a user may have a status of "open", a service offer for which a booking has been requested but not yet confirmed may have a status of "pending", and a service offer that has been confirmed by the non-standard provider may have a status of "booked". A service request may be, for example, a message (e.g., an SMTP message) sent using the DTN, and may be stored in the extended data record. A service request may be transmitted by the data management application 12 to the NSP system 18 of the non-standard provider each time a travel agent requests a service associated with the non-standard provider. Each service request may contain elements that describe the service the traveler is looking to add to their trip.

Information contained in the service request may include a title, a service request identifier, an origin location (e.g., country, region and/or city), a destination location (e.g., country, region and/or city), a travel date or range of dates, a status of the service request, a creation date (which may be calculated by the system), an expiration date by which the service request must be answered, the names, ages, and types of travelers who want to use the service, a description of the desired service, a type of offer requested (e.g., it is not essential to receive several offers to book a taxi), a maximum number of offers requested, the identity of the user system originating the service request, the identity of an assignee office for the service request, the service types (activity or service) requested, a selection of one or several service types, or any other characteristics of the service being sought.

Figure 3:
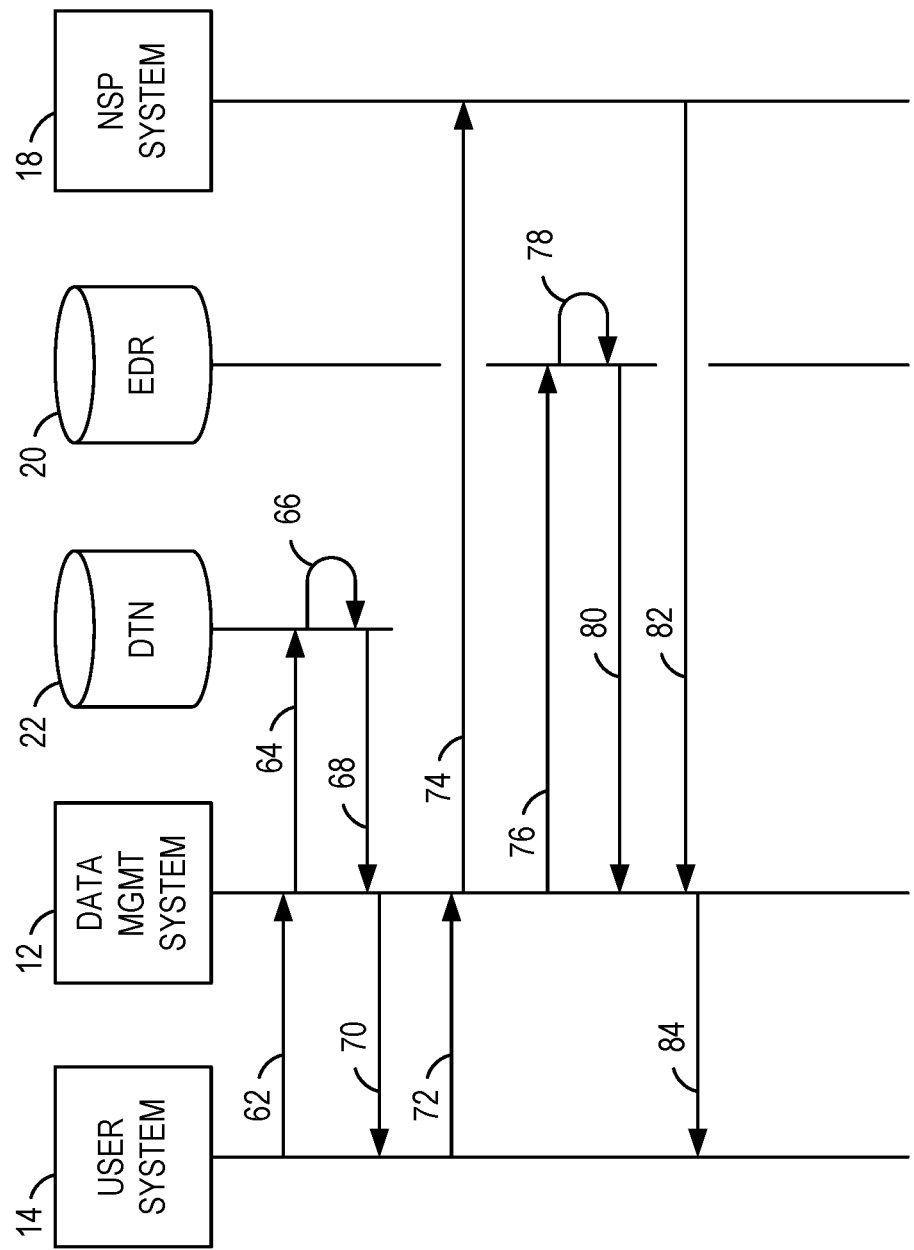
FIG. 3 is a sequence diagram depicting message flow between the data management application, user system, non-standard provider system, EDR database, and DTN database of FIG. 1 for a shopping phase of a travel management process.

FIG. 3 depicts a sequence diagram illustrating an exemplary sequence of messages that may be transmitted between the data management application 12, the user system 14, the NSP system 18, the EDR database 20, and the DTN database 22 in association with a shopping phase of travel planning. This shopping phase may include searching for non-standard services and eliciting offers from one or more non-standard providers. To initiate the process, a user (e.g., a travel agent) may cause the user system 14 to transmit a search query 62 to the data management application 12. The data management application 12 may in turn transmit a database query 64 to the DTN database 22 requesting the database return records matching the search criteria.

In response to receiving the database query 64, the DTN database 22 may perform a search 66 and transmit search results 68 to the data management application 12. The search results may include profiles for non-standard providers and/or services provided by the non-standard providers that satisfy the search criteria in the database query 64. The data management application 12 may then transmit a response 70 to the user system 14 that causes the user system 14 to display at least a portion of the search results returned by the DTN database 22. The search results may be filtered and/or formatted by the data management application 12, and may identify one or more non-standard providers and/or one or more services offered by the non-standard providers that match the search criteria in the search query 62. Filtering may be based at least in part on a rank of the non-standard provider. The rank may, in turn, be based on a ranking value stored in the profile record associated with the non-standard provider.

In response to the travel agent selecting one or more of the displayed search results, the user system 14 may transmit a message 72 to the data management application 12 requesting offers to provide one or more of the non-standard services identified by the search results. Selection of the displayed search results may comprise, for example, filling out an online form with information used to generate a service request. In response to receiving the message 72, the data management application 12 may transmit one or more service requests to one or more non-standard provider systems. For purposes of clarity, only a single service request 74 is transmitted to the NSP system 18 in the example depicted by FIG. 3.

The data management application 12 may link the service request 74 to an extended data record in the EDR database 20 that is associated with a travel itinerary to which the non-standard service is to be added. The data management application 12 may create the link, for example, by transmitting a message 76 to the EDR database 20. The message may request, for example, that the EDR database 20 associate 78 the service request 74 with a specific extended data record. The association may be created, for example, by adding an entry to an index that associates the service request identifier of the service request 74 with a record locator of the extended data record in which a copy of the service request 74 is stored. In response to the association being created, the EDR database 20 may transmit a confirmation message 80 to the data management application 12.

In response to receiving the service request 74, the NSP system 18 may display information that defines the travel itinerary the service request is associated with, and the status of the service request. The travel itinerary and status of the service request may be defined, for example, based on data in the service request 74. At least a portion of this data may have been extracted from the associated extended data record and added to the service request by the data management application 12, and may be displayed by the NSP system 18 as part of a "dashboard" provided by a user interface of the data management application 12 that is displayed through NSP system 18.

The non-standard provider may review the displayed data and cause the NSP system 18 to transmit a service offer 82 to the data management application 12. The service offer 82 may define a non-standard service and terms for purchasing the non-standard service. The data management application 12 may, in turn, transmit a message 84 to the user system 14 that causes the user system 14 to display information that defines the offer. This information may, for example, identify the non-standard service and how much it will cost to book the non-standard service.

By way of example, in operation, a traveler may indicate to a travel agent that they would like to attend a sporting event while on a trip to New York City. In response, the travel agent may cause the user system 14 issue a search for tickets to a sporting event occuring in the vicinity of New York during a specified period of time while the traveler will be in New York. In response to receiving the search query, the data management application 12 may query the DTN database 22 for non-standard providers and/or services that match the search criteria, e.g. a sporting event in the New York area during the specified time. The DTN database 22 may return search results that identify various packages for, and/or non-standard providers of, tickets to one or more sporting events, e.g., one or more games involving the Knicks® or Nets® of the National Basketball Association® (NBA).

If the search results returned by the data management application 12 include search results that the travel agent believes the traveler would be interested in (e.g., one or more ticket packages to a Knicks game), the travel agent may request offers for one or more of the search results. In response to the travel agent indicating they would like to receive offers connected with a search result, the data management application 12 may transmit a service request to each NSP system 18 associated with the one or more selected search results and save the service requests in the EDR database 20. The non-standard providers may, in turn, cause their respective NSP system 18 to transmit service offers to the data management application 12.

In response to receiving the service offers from the NSP systems 18, the data management application 12 may cause the user system 14 to display information describing the offers to the travel agent. The data management application 12 may also store the service offers in the EDR database 20 for later viewing or reference. The information displayed on the user system 14 may include an identity and a rating of the non-standard provider, information on the services that are available for booking (e.g., tickets to sporting events), and proposed terms of each offer (e.g., prices and dates for the sporting events).

Figure 4:
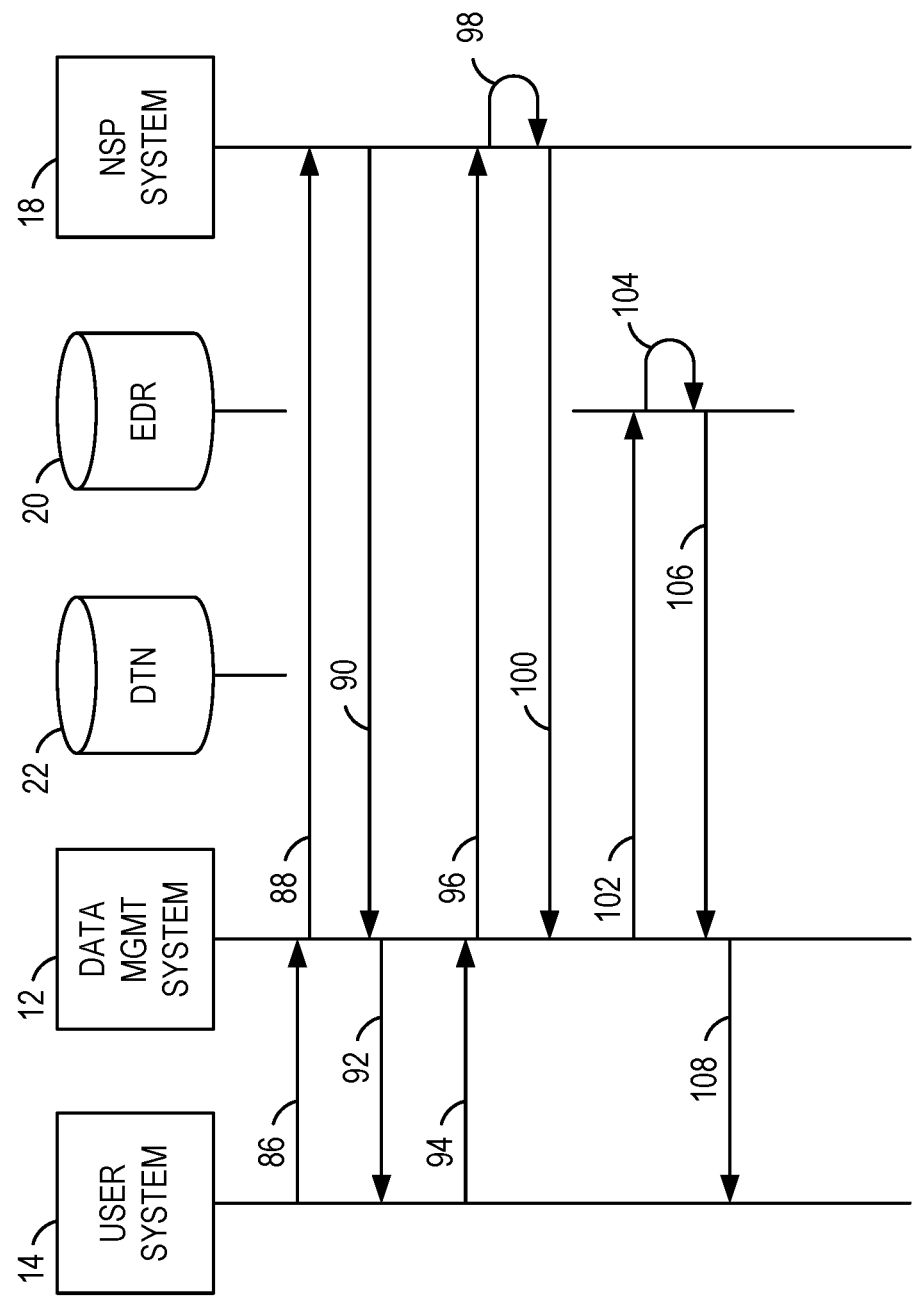
FIG. 4 is a sequence diagram depicting message flow between the data management application, user system, non-standard provider system, EDR database, and DTN database of FIG. 1 for pre-booking and booking phases of the travel management process.

FIG. 4 depicts a sequence diagram illustrating an exemplary sequence of messages that may be generated in association with pre-booking and booking phases for the travel itinerary. The pre-booking phase may include negotiation and selection of an offer from one of the non-standard providers to include in the travel itinerary. The travel agent may begin by selecting one or more of the offers being displayed by the user system 14, and providing an indication that a counter-offer is to be made. To this end, and in response to receiving input from the travel agent, the user system 14 may transmit a request 86 to the data management application 12 that defines terms of the counter-offer. The request 86 may include data defining proposed terms that would be acceptable to the travel agent, e.g., a lower price and/or higher level of service. Optionally, if the current offer is acceptable to the travel agent, the travel agent may skip sending the request 86, and simply forward the existing offer to the traveler for approval.

In response to receiving the request 86 from the user system 14, the data management application 12 may transmit a service request 88 to the NSP system 18. In cases where more than one offer is being considered (e.g., where there were multiple service offers received from different NSP systems), the data management application 12 may send service requests 88 to multiple NSP systems. In any case, the data management application 12 may identify the service offers and/or NSP systems 18 associated with the request 86 using the index. The service request 88 may trigger a start of a negotiation process comprising one or more exchanges of service requests/service offers between the user system 14 and NSP system 18, with the exchange being managed by the data management application 12.

In response to receiving the service request 88, the NSP system 18 may display information that defines the terms of the counter-offer. The non-standard provider may review the displayed data and cause the NSP system 18 to transmit a new service offer 90 to the data management application 12. The service offer 90 may define a new non-standard service and/or updated terms for purchasing the non-standard service. The data management application 12 may, in turn, transmit a message 92 to the user system 14 that causes the user system 14 to display information that defines the updated offer.

If the terms of the new offer are satisfactory to the travel agent, the offer may be presented to the traveler for approval. If the traveler approves of the offer, the travel agent may cause the user system 14 to transmit a message 94 to the data management application 12 indicating that the non-standard service has been accepted. In response to receiving the message 94, the data management system may transmit a request 96 to the NSP system 18 informing the non-standard provider that the service offer has been accepted, and the non-standard provider should reserve the service under the terms of the last service offer. In response to receiving the request 96, the NSP system 18 may reserve the service 98, and transmit a booking confirmation 100 to the data management application 12. The booking confirmation 100 may include documents, such as tickets or vouchers with embedded codes (e.g., a QR code or other machine readable code) that are redeemable for the non-standard service.

In response to receiving the booking confirmation 100, the data management application 12 may transmit a request 102 to the EDR database 20 requesting the non-standard service be added to the itinerary associated with the service request identifier. The EDR database 20 may then add an element 104 that defines the reserved non-standard service to the extended data record. Elements may also be added to the extended data record that define the vouchers. These elements may be stored, for example, in the extended data structure of the extended data record. Once the element 104 has been added to the extended data record, the EDR database 20 may transmit a confirmation 106 to the data management application 12, which in turn may transmit a confirmation 108 to the user system 14. The travel agent may then transmit the voucher documents to the traveler so that the traveler can present the vouchers to the non-standard provider, e.g., as a paper printout or using a device such as a smart phone to display the voucher.

Continuing with the above operating example, the travel agent may respond to a ticket package offered by one or more of the non-standard providers with one or more counter-offers to purchase the proposed ticket package. One counter-offer may define a different set of tickets (e.g., tickets at mid-court verses tickets behind the basket) for an offer from a non-standard provider that sells tickets to Knicks' games. Another counter-offer may define tickets at a lower price (e.g., $150 vs $200) for an offer from a non-standard provider of tickets to a Nets' game. Yet another counter offer may define both a different set of tickets (e.g., tickets at mid-court verses tickets behind the goal) and a lower price (e.g., $150 vs $200) for an offer from a non-standard provider of tickets for a game involving the Rangers® of the National Hockey League® (NHL).

If the non-standard provider accepts the counter-offer, or makes an acceptable counter-offer of their own, the travel agent may present one or more offers to the traveler by, for example, sending the offers to the traveler in an email or by calling the traveler. In response to the traveler accepting an offer, the travel agent may proceed to book the selected non-standard service as described above with respect to FIG. 4.

When issuing a service request for a commodity (e.g., a jet ski rental), a single service request may be transmitted to several providers so that the providers can bid on the service request. The providers may answer the service request by creating independent service offers. Each service offer may be assigned a different status, with the travel agent selecting the best offers to forward to the traveler. The status of each service request may be automatically updated in the EDR database 20 based on the statuses of the service offers received by the data management application 12.

The data management application 12 and EDR database 20 may operate cooperatively to integrate service requests with the extended data record of the traveler. Embodiments of the invention may thereby enable the travel agent to build packages of services that can be added to the travel itinerary upon request by the traveler. The centralized view provided by adding non-standard services to the extended data record may improve the ability of the travel agent and/or traveler to manage trip planning and traveling. The centralized view may also enable the travel agent to package activities from multiple destination service providers into a single travel itinerary.

Embodiments of invention may solve the problem of integrating the booking of non-standard services into the booking flow process provided by the data management system 26. Information related to non-standard services added to a trip can be stored in the extended data record as the information is generated, beginning with the search for services and continuing through the booking process. Booking flow may include the shopping phase, an offers phase, a confirmation booking phase, a payment phase, and an after sales phase.

During the shopping phase, the queries issued by the travel agent or the traveler (e.g., searching for trip ideas using an online travel agency website) can be done by querying the DTN database 22 and storing the results in the EDR database 20. This is in contrast to a conventional GDS, which cannot store search results for, or otherwise manage the booking of non-standard services.

In response to the travel agent submitting a service request, the service request may be transmitted to one or more relevant non-standard provider systems. This may provide the non-standard providers with the opportunity to make an offer that satisfies the service request. The data management application 12 may apply filters to the service request to control which NPS systems the service requests are sent to. These filters may identify and/or target specific non-standard providers who are considered likely to provide competitive service orders that satisfy the service request. The filters may filter the service requests based on the characteristics of each service request and of the non-standard provider profiles.

Each non-standard provider who responds to the service request may have their service offer linked to the specific service request. Each extended data record may define a travel proposal that includes flights, hotels, car rentals, excursions, and/or local content. The extended data record may provide this feature by storing standard elements in the standard data structure, and storing non-standard elements in the extended data structure.

Each service offer may be analyzed by the travel agent to determine if the proposal defined by the service offer matches the dates, type of service, and budget expected by the traveler. For each validated service offer proposed by a non-standard provider, the travel agent may transform the service offer into a total travel itinerary offer that is sent to the traveler. This feature may enable the travel agent and/or traveler to display and view the entire itinerary as a single offer while at the travel agency or by using a web browser. Once the offer is accepted by the traveler, the travel agent may book the travel itinerary using the extended travel record. All the structured information stored in service offers that have been transformed into the traveler itinerary can be automatically confirmed and stored by the data management system 26.

In addition to facilitating the ability to automatically integrate non-standard services into an integrated travel itinerary, storing information collected during the inspiration/shopping phase may enable the data management system 26 to capture large amounts information that relates to the preferences, expectations, trends, and budgets of customers with respect to services. The storage of pre-booking phase data by the data management system 26 may enable extraction of business intelligence data relating to traveler preferences and trends. Reports based on this business intelligence data may allow non-standard providers to map out improved market positioning and strategies for selling their services.

For example, the data management system 26 may collect statistics about services, and generate activity reports that provide information on the number of bookings of a service. This information may be used by the non-standard providers to refine their service offerings, and/or to develop relations with retailers that aggregate services. The data management system 26 may also collect statistics relating to service offers, such as activity reports that provide information on how many service offers are rejected and for what reasons, how many service offers needed clarification, and/or the number of clarification steps required per service offer. The information provided by the activity reports may be used by providers to improve and/or adapt their services based on the season, and/or by changing pricing, qualitative tags, and/or detailed description. This information relating to service offers may be used in conjunction with feedback provided by travelers.

The data management system 26 may also collect statistics about non-standard providers. These statistics may include, for example, booking/rejection ratios. Travel agents may use this data to rate the non-standard providers they are working with, or to build white/black lists of non-standard providers. Market trend reports may be generated and used to determine trends in non-standard providers based on bookings made using the DTN. These types of reports may include top destination reports having a mix of information, such as mode of travel (e.g., rail, plane, car), routes traveled (including locations along the route), the types of travelers, and dates traveled (e.g., to distinguish seasons). Reports may also focus on top selling services categories (e.g., restaurant, taxi, entertainment) on a per destination or per passenger basis, as well as an average budget per destination.

Service requests may be used to describe the targeted service with several attributes, such as the type of activity, dates, and price ranges. Service request elements may be stored in the extended data record associated with the itinerary to which the service is to be added in a structured way so that the service requests elements are accessible from any channel. The user interface provided by the data management application 12 be configured to provide a chat service. The chat service may be associated with a particular service request, and may allow travel agents to communicate with the non-standard providers in order to ask for clarification, negotiate prices, etc.

The process of centralizing data generated by the pre-booking flow may include collecting data categorized based on different criteria around non-standard services, service requests, and/or service offers. This data may enable the data management system 26 to build reports that can be used to help the positioning and strategy of non-standard providers. These reports may be used to provide statistics about services, provide statistics about service offers, and/or provide statistics about non-standard providers, e.g., booking/rejection ratios. The data management system 26 may also generate market trend reports directed to determining destination service trends based on bookings made using the DTN.

The DTN database 22 may be configured to enable the travel agent to search for content based on numerous criteria. This searching feature may be enabled by structured formatting of the service request, service offers, the non-standard service elements stored in the extended data record, index entries, and or records in the DTN database 22. The extended data record elements relating to pre-booking and booking flow may be flexible enough to enable updating that supports new content attributes or content types, and may be adaptable to needs of a new market or a new type of traveler. Heterogeneity of non-standard providers, services, and traveler needs may be handled using a flexible extended data record data structure.

In some cases, a traveler may have a very specific request, e.g., rental of a silk kimono to wear to dinner at a traditional Asian restaurant. If the travel agent is unable to find a non-standard provider that provides a requested service, the travel agent may create a "bid record" in the DTN database

22. The bid record may be configured so that a service request for the service in question is broadcast to all non-standard providers on the network, or in one or more sub-networks. This feature may enable the travel agency to use the DTN to attempt to satisfy any request or situation. The DTN may also be configured to allow non-standard providers to search for and bid on service requests for services in a specific location, and to answer service requests by creating service offers. Standard DTN booking flow may then be applied to the service offers.

The DTN may also enable advertisement and sponsored links to be embedded into the information displayed to travel agents and non-standard providers. By way of example, a non-standard provider could be charged by the data management system 26 operator to have a sponsored link added into search results by the data management application 12. The sponsored link could appear, for example, in a predetermined number of top search results.

The data management system 26 may be configured so that each travel agency accessing the data management application 12 can blacklist a non-standard provider if, for example, the travel agency is not satisfied by their service. Adding a non-standard provider to a blacklist may prevent the data management application 12 from including content associated with the non-standard provider from being displayed in search results.

The data management system 26 may be configured to allow new non-standard providers to register in the DTN easily, while ensuring the non-standard provider remains secure. For example, a black list may be maintained that prevents certain non-standard provider systems from accessing the DTN database 22, or portions of the DTN database 22.

New non-standard providers may be able to register online and specify their main characteristics and scope of service in their profile. An asynchronous validation process may be performed by standard service providers. In order to keep the registration process as open as possible, the non-standard providers may be limited to accessing only database records that are associated with their own services. However, their services may only be made available to travel agencies after a validation process has been completed.

Local Services (e.g., tickets to sporting events, equipment rental, or personal services such as babysitting) provided by non-standard providers may be heterogeneous by nature. For example, non-standard providers may be located in different countries, have different cultures, and have employees that speak different languages. To accommodate the heterogeneous nature of non-standard providers, the DTN may be configured to allow non-standard providers to describe their services with a high level of detail or a low level of detail. Non-standard services may be fully managed by the data management system 26 (including pre-booking and booking steps) using the features provided by the data management application 12, EDR database 20, and DTN database 22. The DTN may provide a dynamic and flexible tool both for publishing non-standard services and providers, and for searching for non-standard services using dynamic criteria, e.g., tagging and/or geo-location. The extended data record may allow the storage of heterogeneous content and booking of this content into an integrated travel itinerary that also includes standard services.

The data management application 12 may include a user interface that provides a single point of access which replaces the multiple uncoordinated conventional channels available to contact non-standard providers. The data management application 12 may thereby provide a centralized tool to manage pre-booking flow using the extended data record to store and retrieve service requests. This user interface may provide a graphical application to handle pre-booking flow in a user friendly way for the travel agent. In order to provide a similar user experience as the tools used to book standard services, the user interface may integrate booking functions for standard and non-standard providers. The travel agent may thereby freely navigate between booking applications, e.g., for air, car, hotel, and/or non-standard services.

The user interface may provide command line access to the EDR database 20 (including PNRs if present) and DTN database 22, while updating extended data records in a transparent manner. The DTN may act as a single point of access for pre-booking as well as providing end-to-end flow from pre-booking through booking. On the provider side, the data management application 12 may be accessed through a web-based interface in order to adapt to the variable nature of NSP systems 18.

The DTN may provide travelers with a social networking feature for pre-booking. The social networking feature may integrate the DTN with existing social networks (e.g., LinkedIn, Facebook) in order to combine the benefits of the travel/pre-booking capabilities provided by the DTN and the publication/notification functions provided by the social networks. For example, market bids may be published on social networks so that providers can answer bids directly from the social network. The providers could also join through the social network. Notifications sent during service offer negotiation may be published on connected social networks. Connecting through social networks may facilitate access to the DTN from mobile devices by leveraging social networking mobile applications. Connecting to social networks may also increase the flexibility in accessing travel agency and non-standard provider sub-networks in the DTN.

The DTN may be configured to allow the traveler to rate the service provided by a non-standard provider after the trip. In addition to the traveler generated ratings, the travel agent may also be able to rate the non-standard provider. These rating systems may provide a mechanism that helps travel agents select between non-standard providers. The two types of feedback (traveler to non-standard provider and travel agent to non-standard provider) may be used as criteria when searching for non-standard providers or services.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of data, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired data and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, and/or operations specified in the flow-charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow-charts, sequence diagrams, and/or block diagrams.

In certain alternative embodiments, the functions, acts, and/or operations specified in the flow-charts, sequence diagrams, and/or block diagrams may be re-ordered, processed serially, and/or processed concurrently consistent with embodiments of the invention. Moreover, any of the flow-charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, actions, steps, operations, elements, and/or components, but do not preclude the presence or addition of one or more other features, integers, actions, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A data processing system that uses an extended data structure to manage data having a non-standard format, the system comprising:
    one or more processors; and
    a memory coupled to the one or more processors, the memory storing program code that, when executed by the one or more processors, cause the system to:
    link a standard data structure having a standard format to the extended data structure having the non-standard format by storing data in the standard data structure that identifies a location of the extended data structure in a database that is distinct from a respective location of the standard data structure, wherein the standard data structure and the extended data structure comprise an extended data record, and wherein the non-standard format is incompatible with the standard format;
    generate a service request comprising search criteria defining a plurality of characteristics of a requested service;
    store the service request in a first field of the extended data structure;
    transmit the service request to a first server of a first service provider; and
    in response to receiving a first service offer from the first server, create a second field in the extended data structure for linking the stored service request to the first service offer; and
    store the first service offer in the second field of the extended data structure to create a link between the first service offer and the stored service request in the extended data record.

2. The data processing system of claim 1 wherein the standard data structure is linked to the extended data structure by:

storing, in a third field of the standard data structure, data that identifies a location of the extended data structure in a database.

3. The data processing system of claim 1 wherein the program code further causes the system to:
receive a search query from a client application, the search query including a search criteria;
in response to receiving the search query, search a database for profile records that match the search criteria, each of the profile records in the database defining a respective service and identifying a respective provider of the service;
cause the client application to display one or more of the matching profile records; and
receive an input identifying one of the one or more of the matching profile records,
wherein the identified profile record defines the service provided by the first service provider, and the service request is generated in response to receiving the input.

4. The data processing system of claim 3 wherein each profile record is associated with a ranking value, and the one or more of the matching profile records displayed by the client application are selected from the matching profile records based at least in part on the ranking value of each of the matching profile records.

5. The data processing system of claim 4 wherein the program code further causes the system to:
receive a rating of the first service provider from the client application; and
adjust the ranking value of the profile record corresponding to the first service offer based at least in part on the rating.

6. The data processing system of claim 3 wherein the database is hosted by a web server, each profile record is associated with a web page that includes data files describing the respective service, and the program code further causes the system to:
receive one or more data files from the first server; and
define the web page associated with the identified profile record based on the one or more data files.

7. The data processing system of claim 1 wherein the standard data structure includes one or more elements that define an itinerary, and the program code further causes the system to:
receive a first request to book the itinerary;
in response to receiving the first request, extract the first service offer from the extended data structure; and
transmit a second request to the first service provider to book the first service offer.

8. The data processing system of claim 7 wherein the program code further causes the system to:
receive a booking confirmation from the first service provider; and
in response to receiving the booking confirmation, change a status of the first service offer from pending to booked in the extended data structure.

9. The data processing system of claim 1 wherein the program code further causes the system to:
transmit the service request to a second server of a second service provider;
receive a second service offer from the second service provider;
store the first service offer and the second service offer in the extended data structure with a status of open; and
in response to receiving authorization from a client application to accept the first service offer, change the status of the first service offer from open to pending.

10. The system of claim 1, wherein linking the standard data structure to the extended data structure configures the extended data structure to provide centralized storage for managing an itinerary that includes at least one non-standard service while maintaining compatibility with the standard format.

11. A method of using an extended data structure to manage data having a non-standard format, the method comprising:
linking a standard data structure having a standard format to the extended data structure having the non-standard format by storing data in the standard data structure that identifies a location of the extended data structure in a database that is distinct from a respective location of the standard data structure, wherein the standard data structure and the extended data structure comprise an extended data record, and wherein the non-standard format is incompatible with the standard format;
generating a service request comprising search criteria defining a plurality of characteristics of a requested service;
storing the service request in a first field of the extended data structure;
transmitting the service request to a first server of a first service provider; and
in response to receiving a first service offer from the first server, creating a second field in the extended data structure for linking the stored service request to the first service offer; and
storing the first service offer in the second field of the extended data structure to create a link between the first service offer and the stored service request in the extended data record.

12. The method of claim 11 wherein linking the standard data structure to the extended data structure comprises:
storing, in a third field of the standard data structure, data that identifies a location of the extended data structure in a database.

13. The method of claim 11 further comprising:
receiving a search query from a client application, the search query including a search criteria;
in response to receiving the search query, searching a database for profile records that match the search criteria, each of the profile records in the database defining a respective service and identifying a respective provider of the service;
causing the client application to display one or more of the matching profile records; and
receiving an input identifying one of the one or more of the matching profile records, wherein the identified profile record defines the service provided by the first service provider, and the service request is generated in response to receiving the input.

14. The method of claim 13 wherein each profile record is associated with a ranking value, and the one or more of the matching profile records displayed by the client application are selected from the matching profile records based at least in part on the ranking value of each of the matching profile records.

15. The method of claim 13 wherein the database is hosted by a web server, each profile record is associated with a web page that includes data files describing the respective service, and further comprising:
receiving one or more data files from the first server; and
defining the web page associated with the identified profile record based on the one or more data files.

16. The method of claim 11 wherein the standard data structure includes one or more elements that define an itinerary, and further comprising:
- receiving a first request to book the itinerary;
- in response to receiving the first request, extracting the first service offer from the extended data structure; and
- transmitting a second request to the first service provider to book the first service offer.

17. The method of claim 16 further comprising:
- receiving a booking confirmation from the first service provider; and
- in response to receiving the booking confirmation, changing a status of the first service offer from pending to booked in the extended data structure.

18. The method of claim 11 further comprising:
- transmitting the service request to a second server of a second service provider;
- receiving a second service offer from the second service provider;
- storing the first service offer and the second service offer in the extended data structure with a status of open; and
- in response to receiving authorization from a client application to accept the first service offer, changing the status of the first service offer from open to pending.

19. A computer program product for using an extended data structure to manage data having a non-standard format, the computer program product comprising:
- a non-transitory computer-readable storage medium; and
- program code stored on the non-transitory computer-readable storage medium that, when executed by one or more processors, causes the one or more processors to:
- link a standard data structure having a standard format to the extended data structure having the non-standard format by storing data in the standard data structure that identifies a location of the extended data structure in a database that is distinct from a respective location of the standard data structure, wherein the standard data structure and the extended data structure comprise an extended data record, and wherein the non-standard format is incompatible with the standard format;
- generate a service request comprising search criteria defining a plurality of characteristics of a requested service;
- store the service request in a first field of the extended data structure;
- transmit the service request to a first server of a first service provider; and
- in response to receiving a first service offer from the first server, create a second field in the extended data structure for linking the stored service request to the first service offer; and
- store the first service offer in the second field of the extended data structure to create a link between the first service offer and the stored service request in the extended data record.

\* \* \* \* \*